United States Patent
Cachia

(10) Patent No.: US 9,312,667 B2
(45) Date of Patent: Apr. 12, 2016

(54) DEVICE FOR LOCKING TO A DIN RAIL

(71) Applicant: Control Techniques Limited, Newtown (GB)

(72) Inventor: Charles Anthony Cachia, Welshpool (GB)

(73) Assignee: CONTROL TECHNIQUES LIMITED, Newtown (GB)

( * ) Notice: Subject to any disclaimer, the term of this patent is extended or adjusted under 35 U.S.C. 154(b) by 0 days.

(21) Appl. No.: 14/276,444

(22) Filed: May 13, 2014

(65) Prior Publication Data

US 2014/0339186 A1 Nov. 20, 2014

(30) Foreign Application Priority Data

May 16, 2013 (GB) .................................. 1308809.1

(51) Int. Cl.
H02B 1/052 (2006.01)

(52) U.S. Cl.
CPC ............ H02B 1/0526 (2013.01); H02B 1/0523 (2013.01); Y10T 29/49826 (2015.01)

(58) Field of Classification Search
CPC ...... H01R 9/26; H01R 9/2608; H01R 9/2691; H02B 1/052; H02B 1/0523; H02B 1/0526; H05K 7/12; H05K 7/183
USPC ................. 248/228.5, 229.14, 229.24, 230.5, 248/231.61, 346.06; 269/60, 65, 101, 241, 269/242; 439/532
See application file for complete search history.

(56) References Cited

U.S. PATENT DOCUMENTS

| | | | | |
|---|---|---|---|---|
| 969,986 | A * | 9/1910 | Sawaya | 72/416 |
| 1,008,926 | A * | 11/1911 | Saylor | 269/218 |
| 1,471,118 | A * | 10/1923 | Gething | 269/101 |
| 1,499,989 | A * | 7/1924 | Lehmann | 269/101 |
| 1,764,264 | A * | 6/1930 | Jones et al. | 211/51 |
| 1,811,299 | A * | 6/1931 | Brockhaus, Jr. | 269/242 |
| 2,695,649 | A * | 11/1954 | Tilden | 269/153 |
| 5,775,955 | A * | 7/1998 | Graube et al. | 439/717 |
| 6,431,909 | B1 * | 8/2002 | Nolden et al. | 439/532 |
| 7,674,129 | B1 | 3/2010 | Liu | |
| 2015/0181745 | A1* | 6/2015 | Hand et al. | 439/532 |

FOREIGN PATENT DOCUMENTS

| | | | |
|---|---|---|---|
| DE | 202010009210 | 10/2010 | |
| DE | 102013103544 | * 10/2014 | |
| EP | 411472 A1 | * 2/1991 | .............. B25B 1/10 |
| EP | 1331712 A1 | * 7/2003 | ............. H02B 1/052 |
| EP | 1672743 A1 | * 6/2006 | |
| GB | 1410578 A | * 10/1975 | |
| GB | 2059908 A | * 4/1981 | .............. B67B 7/30 |
| WO | WO 2004114466 A1 | * 12/2004 | .............. H01R 9/26 |

* cited by examiner

*Primary Examiner* — Joshua Rodden
(74) *Attorney, Agent, or Firm* — Harness, Dickey & Pierce, P.L.C.

(57) ABSTRACT

A device for locking to a DIN rail includes a shaft defining an axis of rotation and first and second rail-engaging members connected to the shaft. The rail-engaging members are each shaped to engage a DIN rail in a respective engaging position. The shaft is rotatable about the axis of rotation and thereby arranged to urge each rail-engaging member into its respective engaging position with a DIN rail positioned between the first and second rail-engaging members. Other example devices for locking to a DIN rail and methods of mounting component(s) to a DIN rail are also disclosed.

20 Claims, 11 Drawing Sheets

DEVICE FOR LOCKING TO A DIN RAIL

CROSS-REFERENCE TO RELATED APPLICATION

This application claims the benefit and priority of Great Britain Patent Application No. 1308809.1 filed May 16, 2013. The entire disclosure of the above application is incorporated herein by reference.

FIELD OF THE INVENTION

The present invention relates to a device for locking to a DIN rail, and in particular to a device capable of being locked or clamped to a DIN rail so that electrical devices or components may be mounted to the DIN rail.

BACKGROUND TO THE INVENTION

DIN rails are standard metal pressings used for mounting industrial control equipment, such as connectors, switches, machine controllers, and circuit breakers. They come in various standardised shapes and can be cut to a desired length in accordance with the environment in which they will be installed. A DIN rail may be attached to a ceiling, or inside a cabinet, for example, so that electrical components may be attached, hung or suspended therefrom. Alternatively, a DIN rail may extend along a wall, again, so that electrical equipment may be attached thereto.

In order to mount a component to the DIN rail, a locking mechanism must generally be used. Various locking mechanisms exist, such as the one described in U.S. Pat. No. 7,674,129 B1. However, such mechanisms have the tendency to be overly complicated and burdensome. As a result, they can be prone to faults and can be difficult to install, and it may take a significant amount of time to attach/detach them from a DIN rail.

There is therefore a need in the art to provide a simpler and more economical device for locking to a DIN rail. The present invention seeks to address this and other deficiencies encountered in the prior art.

SUMMARY OF THE INVENTION

In a first aspect of the present invention, there is provided a device for locking to a DIN rail. The device comprises a shaft defining an axis of rotation, and first and second rail-engaging members connected to the shaft. The rail-engaging members are each shaped to engage a DIN rail in a respective engaging position. The shaft is rotatable about the axis of rotation and thereby arranged to urge each rail-engaging member into its respective engaging position with a DIN rail positioned between the first and second rail-engaging members.

The inventive device, hereinafter referred to as either a locking device or clamping device, may function with any type of DIN rail, as it may deliver a locking or clamping force on both sides of a DIN rail. The DIN rail (as known in the art) may take different forms and different dimensions. DIN rails typically have one of three cross-sections: a G-shaped cross-section; a C-shaped cross-section; or a hat-shaped (or more particularly a top-hat shaped) cross-section.

The rail-engaging members, or locking/clamping members, may take various forms. In one embodiment, the rail-engaging members are rectangular blocks that are shaped and constructed to withstand a clamping or vice-like force exerted on them as they are urged into their respective clamping, locking or engaging positions with the DIN rail. The rail-engaging members may be made of plastic. They may be connected to, coupled, or otherwise threaded onto the shaft. In some embodiments, there may not be a direct connection between the shaft and the rail-engaging members, but instead rotation of the shaft may induce corresponding motion in the rail-engaging members through other mechanical means acting between the shaft and the rail-engaging members. The shaft and rail-engaging members are preferably made of a high-quality plastic, as it is easy to mould, or else magnesium, zinc or aluminium. The clamping device may typically support weights in the region of 1-2 kg.

Advantageously, the invention provides for a simple and economic means of locking a device to a DIN rail. Once locked to the DIN rail, an electrical component such as a circuit breaker or the like may in turn be mounted or coupled to the device. The locking device may provide for rapid removal/attachment to the DIN rail which is particularly advantageous when components need to be rapidly installed in place or moved to new locations, something not achieved in the prior art which must often rely on the use of separately removable locks. Equipment may either be mounted directly to the locking device or indirectly by mounting the component or electrical equipment to a platform or other support that is itself attached to the locking device.

The shaft may be further arranged to cause the first and second rail-engaging members to translate in opposite directions. The translation may be in a direction substantially parallel with the axis of rotation. Providing for translation in opposite directions allows for a more rapid attachment/removal of the device from a DIN rail. However, the invention contemplates other forms of urging or otherwise imparting motion to the rail-engaging members. For example, the clamps or rail-engaging members may be rotated into their respective engaging positions using a cam arrangement actuated through rotation of the shaft. The shaft may be further arranged to simultaneously urge the first and second rail-engaging members into their respective engaging positions.

The first and second rail-engaging members may each comprise a threaded bore. The bore may or may not extend all the way through the rail-engaging members. Furthermore, the pitch of the thread within the bore may be varied in order to control the rate at which the rail-engaging member will engage the DIN rail.

The shaft may comprise first and second threaded portions. Each threaded portion may extend along the shaft only so far as the length of each respective threaded bore, for example so as to minimise manufacturing costs. The shaft may comprise first and second threaded portions, the first and second rail-engaging members may each comprise a threaded bore, and the first and second rail-engaging members may be connected to the shaft such that the threaded bore of each rail-engaging member engages with a respective threaded portion of the shaft.

Preferably, the shaft may be formed of at least two shaft portions joined together, each of two of the at least two shaft portions comprising one of the threaded portions. In particular, the shaft may be formed of two individual shaft portions. This may allow for the shaft and rail-engaging members to be assembled together with less time and expense. However, in other embodiments, it could be envisaged that the rail-engaging members may each come in two halves, and may be placed over their respective threaded portion on the shaft, and subsequently fixedly joined together over the threaded portion. A further variation of the inventive locking device may involve each lock or clamp only partially surrounding the shaft. In other words, each lock may be sit or rest upon the shaft. Advantageously, using two shaft portions allows a user to easily connect or couple each lock to a different shaft portion prior to attachment to a DIN rail.

Each threaded portion may comprise a direction of rotation opposite to that of the other threaded portion. Using threaded portions with oppositely-oriented threads may provide for a simple and rapid means of allowing the rail-engaging members to be urged into their respective engaging positions. Furthermore, in this embodiment, as each unit of rotation of the shaft results in two units of translation, more rapid attachment and removal from the DIN rail may be enabled.

Each rail-engaging member may comprise a rail-contacting portion arranged such that, in the engaging position of the rail-engaging member, the rail-contacting portion engages a portion of the DIN rail such that the device is prevented from moving relative to the DIN rail in at least one direction. The at least one direction may comprise a direction normal to the axis of rotation of the shaft and substantially normal to a longitudinal axis defined by the DIN rail. In other embodiments, a more secure and robust lock may be achieved, in which case the device would effectively be prevented from moving relative to the DIN rail in all directions. Thus, the engagement position of each rail-engaging member may provide in some cases for some movement of the device relative to the DIN rail, and in other cases may provide a full lock and prevent any such movement.

Each rail-contacting portion of the first and second rail-engaging members may be arranged to engage with an outwardly extending flange of the DIN rail. The rail-contacting portions may resemble projections or lips extending from an end of the rail-engaging member. The rail-contacting portion may engage a flange of the DIN rail from above. In this case, the engagement of a rail-contacting portion with an outwardly extending flange of the DIN rail may allow the device to effectively hang or suspend from a horizontally-installed DIN rail.

In other embodiments, the rail-engaging member may comprise a stopping portion that may abut or engage against the DIN rail as the rail-engaging member is urged into its engagement position. This may provide a clamping force to lock the device to the DIN rail. This clamping force may act in addition to the rail-contacting portions engaging with a DIN rail flange from above.

In some embodiments, each rail-contacting portion may have a similar dimension to an outwardly protruding flange of the DIN rail. Thus, in combination with the clamping force exerted by the stopping portions on the side of the DIN rail, a more effective engagement of the device with the DIN rail may be enabled.

The device may be coupled to or with a platform capable of supporting a component mounted thereto. The platform may have dimensions in the region of 95 mm×25 mm×12 mm, though these are of course merely exemplary. The shaft may be arranged to rotate relative to the platform. Thus, the platform may provide a base for allowing relative movement (for example relative rotation) between the shaft and the rail-engaging members. The platform may be a back panel of an electrical component or device that is to be locked to a DIN rail. The platform or back panel may facilitate attachment of electrical equipment to the DIN rail via the locking device. Such equipment may include connectors, switches, and machine controllers. Advantageously, the rail-engaging member may abut or otherwise engage the platform which may provide for easier rotation of the shaft relative to the rail-engaging members. In other words, a stable, flat platform may be provided against which the locks may translate relative thereto.

The device may further comprise an indexing member for indicating a magnitude of a rotation of the shaft relative to the platform. This magnitude of rotation may be linked to a predetermined amount of movement of the rail-engaging members. Thus, based on the indexing feature, a user may know when the rail-engaging members have been urged into their respective engaging positions, for example.

In one particular embodiment of the indexing feature, the shaft may comprise a resilient member received within a corresponding recess of the platform. The device may be arranged such that rotation of the shaft relative to the platform may cause the resilient member to disengage from the recess. For example, the resilient member may be formed on the shaft and may be arranged to rotate within an annular guide with one or more slots formed in it. Continued rotation of the shaft may cause the resilient member to disengage from one slot and re-engage with another one of the slots, thereby indicating to a user that a predetermined amount of rotation has taken place. This predetermined rotation may correspond to the rail-engaging members having moved between their respective engaging positions.

In a second aspect of the present invention, there is provided method of mounting a component to a DIN rail. The method comprises positioning the DIN rail between first and second rail-engaging members connected to an actuator. The method further comprises triggering the actuator so as to simultaneously urge each rail-engaging member into engagement with the DIN rail. The method further comprises mounting the component to the actuator and/or at least one of the rail-engaging members. The method may therefore provide for rapid and efficient means of mounting a component to a DIN rail, through a clamping or locking effect created using a pair of rail-engaging members engaging each side of the DIN rail.

The actuator may be a shaft defining an axis of rotation. Triggering the shaft may comprise rotating the shaft to urge each rail-engaging member into its respective engaging position with the DIN rail.

The shaft may be further arranged to cause the first and second rail-engaging members to translate in opposite directions. The translation may be in a direction substantially parallel with the axis of rotation.

The shaft may be further arranged to simultaneously urge the first and second rail-engaging members into their respective engaging positions.

The first and second rail-engaging members may each comprise a threaded bore.

The shaft may comprise first and second threaded portions. The shaft may be formed of at least two shaft portions joined together, each of two of the at least two shaft portions comprising one of the threaded portions.

The shaft may comprise first and second threaded portions, wherein the first and second rail-engaging members may each comprise a threaded bore, and wherein the first and second rail-engaging members may be connected to the shaft such that the threaded bore of each rail-engaging member engages with a respective threaded portion of the shaft.

Each threaded portion may comprise a direction of rotation opposite to that of the other threaded portion.

The DIN rail may have a top hat cross-section, a C-shaped cross-section, or a G-shaped cross-section.

Each rail-engaging member may comprise a rail-contacting portion arranged such that, in the engaging position of the rail-engaging member, the rail-contacting portion engages a portion of the DIN rail such that the device is prevented from moving relative to the DIN rail in at least one direction. The at least one direction may comprise a direction normal to the axis of rotation of the shaft and substantially normal to a longitudinal axis defined by the DIN rail.

Each rail-contacting portion of the first and second rail-engaging members may be arranged to engage with an outwardly extending flange of the DIN rail.

The device may be coupled to or with a platform capable of supporting a component mounted thereto.

The shaft may be arranged to rotate relative to the platform.

The device may further comprise an indexing member for indicating a magnitude of a rotation of the shaft relative to the platform.

The shaft may comprise a resilient member received within a corresponding recess of the platform. The device may be arranged such that rotation of the shaft relative to the platform may cause the resilient member to disengage from the recess.

In a third aspect of the invention, there is provided a method of forming a device for locking to a DIN rail. The method comprises threading a first rail-engaging member onto a first threaded shaft portion. The method also comprises threading a second rail-engaging member onto a second threaded shaft portion. The method also comprises joining the first and second shaft portions.

Each rail-engaging member may be shaped to engage a DIN rail.

BRIEF DESCRIPTION OF THE DRAWINGS

Preferred embodiments of the invention will now be described in connection with the accompanying drawings, of which:

FIG. 12 is a perspective view of a DIN rail having a C-shaped cross-section according another example embodiment.

FIG. 13 is a perspective view of a DIN rail having a G-shaped cross-section according yet another example embodiment.

DETAILED DESCRIPTION OF PREFERRED EMBODIMENTS

The present invention seeks to provide an improved device for locking to a DIN rail. Whilst various embodiments of the invention are described below, the invention is not limited to these embodiments, and variations of these embodiments may well fall within the scope of the invention which is to be limited only by the appended claims.

Figure 1:
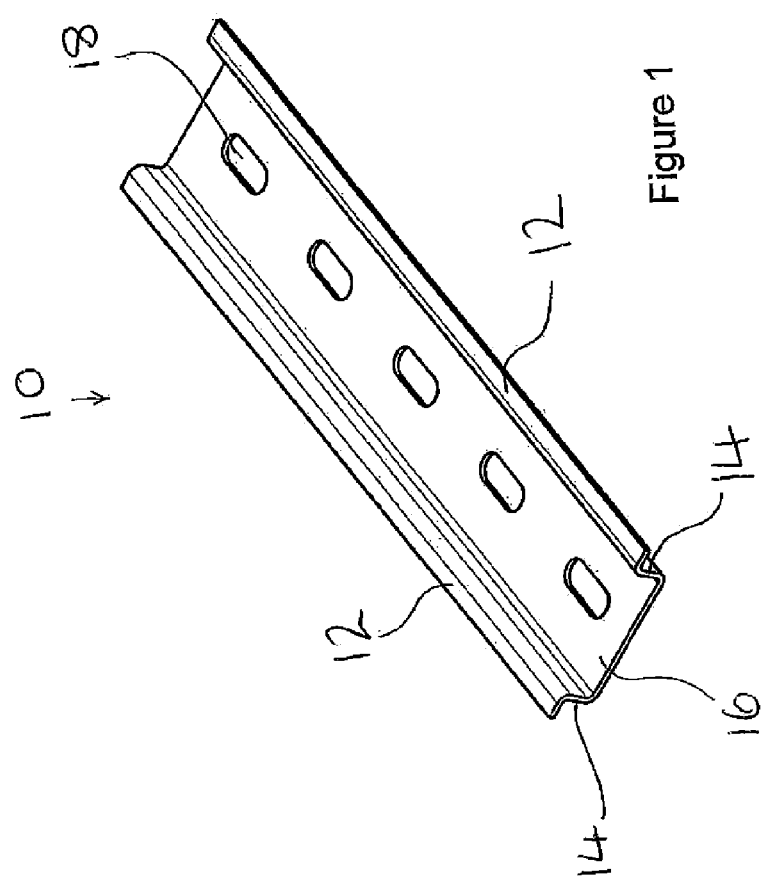
FIG. 1 is a perspective view of a DIN rail used in connection with a preferred embodiment of the invention.

FIG. 1 shows a typical DIN rail 10. DIN rail 10 has a hat-shaped cross-section characterised by two outwardly protruding flanges 12, joined at right angles to two vertical upright portions 14. Upright portions 14 are connected by top portion 16 with apertures 18 formed therein. Apertures 18 may be used to affix DIN rail 10 to a wall or ceiling, for example. The exact dimensions of DIN rail 10 may vary. In addition, other types of DIN rails with different cross-sections (such as a C-section or a G-section) may be used with the present invention.

Figure 2:
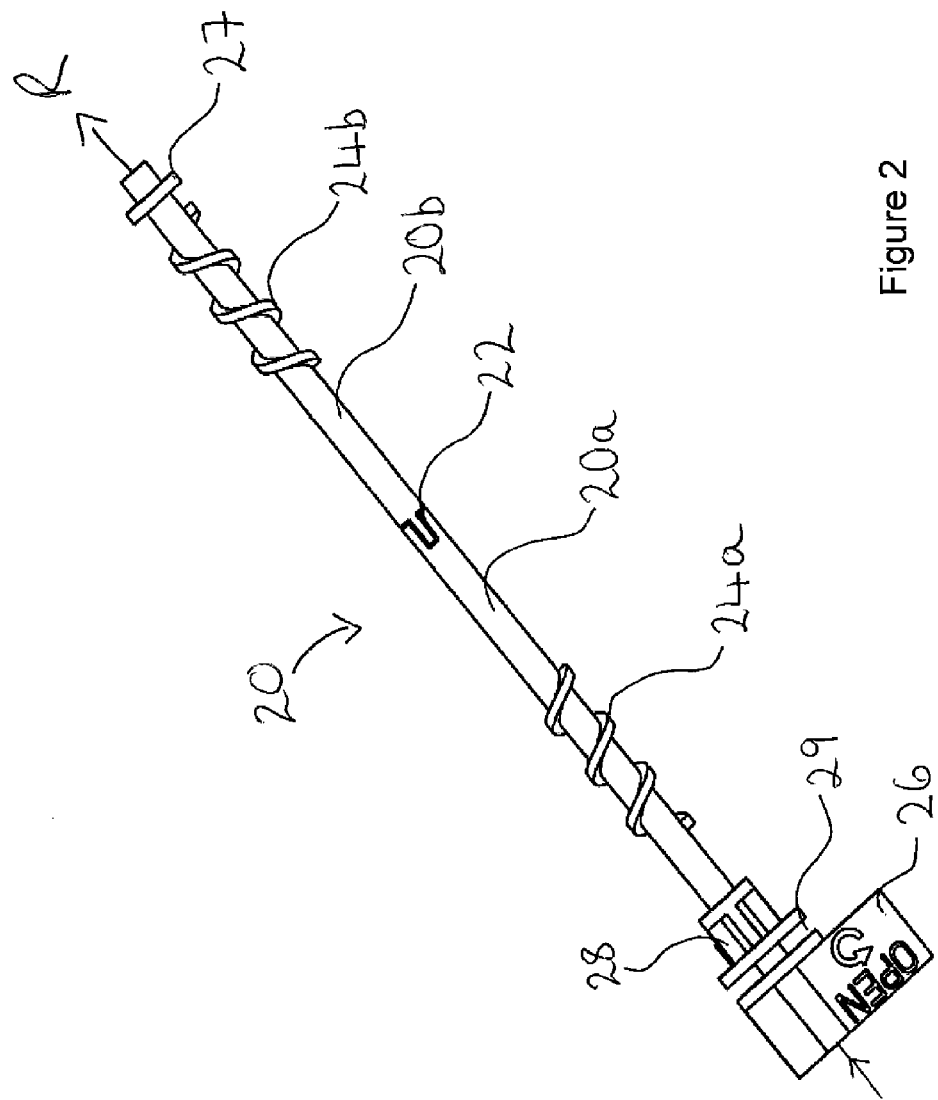
FIG. 2 is a perspective view of a shaft in accordance with a preferred embodiment of the invention.

FIG. 2 shows a shaft 20 according to a preferred embodiment of the present invention. Shaft 20 is formed of two individual shaft portions 20a and 20b, joined together at join 22. In other embodiments, shaft 20 may be formed of more than two portions, or a single portion.

Each shaft portion 20a, 20b comprises a respective threaded portion 24a, 24b. Threaded portions 24a and 24b each comprise a thread or winding that spirals in a direction opposite to that of the other threaded portion. Thus, in FIG. 2, using the axis of rotation R defined by shaft 20, threaded portion 24a comprises a thread winding in a clockwise direction (when looking in the direction of axis R) whilst threaded portion 24b comprises a thread winding in a counter-clockwise direction (when looking in the direction of axis R). In other embodiments, threaded portions 24a and 24b may be positioned at different points along shaft 20. For example, threaded portions 24a and 24b may each extend from either end of shaft 20 and meet at join 22.

Shaft 20 is rotatable about axis of rotation R. Rotation may be assisted using handle 26 at one end of shaft portion 20a. A marker or other display is provided on handle 26 to indicate the direction of rotation that shaft 20 must be moved in in order to close/open locks engaged with shaft 20, as will be described in more detail below.

Shaft 20 further comprises an indexing member 28 disposed adjacent to handle 26, described in more detail below. At an end of shaft portion 20b is provided a stop 27. Between handle 26 and indexing element 28 is a gap 29 in the shape of an annular groove.

Figure 3:
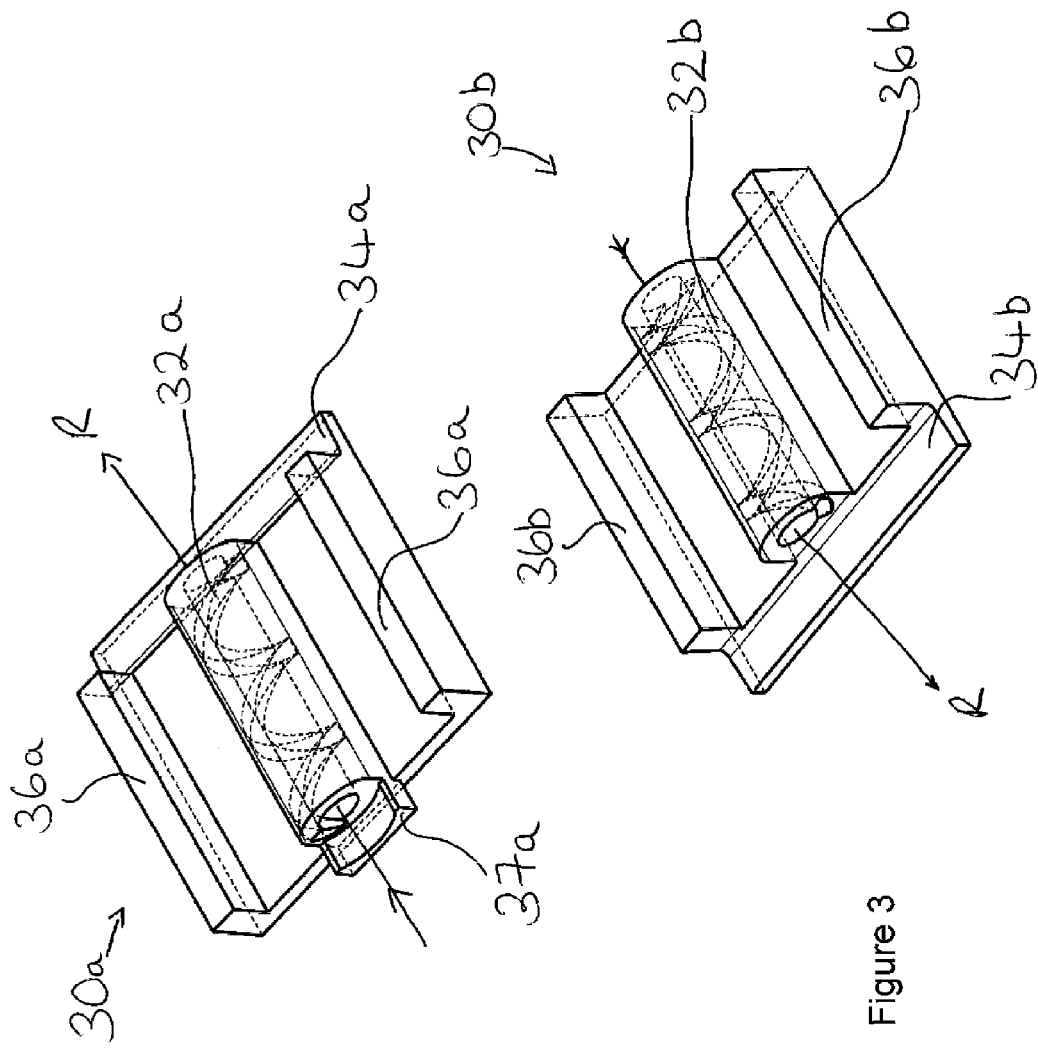
FIG. 3 is a perspective view of two locks in accordance with a preferred embodiment of the invention.

FIG. 3 shows a pair of rail-engaging members, clamps or locks 30a and 30b, according to a preferred embodiment of the invention. Each lock 30a, 30b, comprises a respective internal threaded bore 32a, 32b, extending from one end of the lock to the opposite end. Each lock 30a, 30b, further comprises a respective rail-contacting portion or flange 34a, 34b, and a respective pair of stops or stopping portions 36a, 36b, disposed on either side of the lock and extending in a direction substantially parallel to the threaded bore 32a, 32b. Lock 30a further comprises a spring guide 37a adjacent threaded bore 32a and opposite rail-contacting portion 34a. The threads of threaded bores 32a and 32b wind respectively in a clockwise manner and a counter-clockwise manner, when looking down threaded bore 32a, 32b in the direction of axis of rotation R. Whilst locks 30a and 30b shown in FIG. 3 have a relatively rectangular shape, other shapes of locks may be used.

Figure 4:
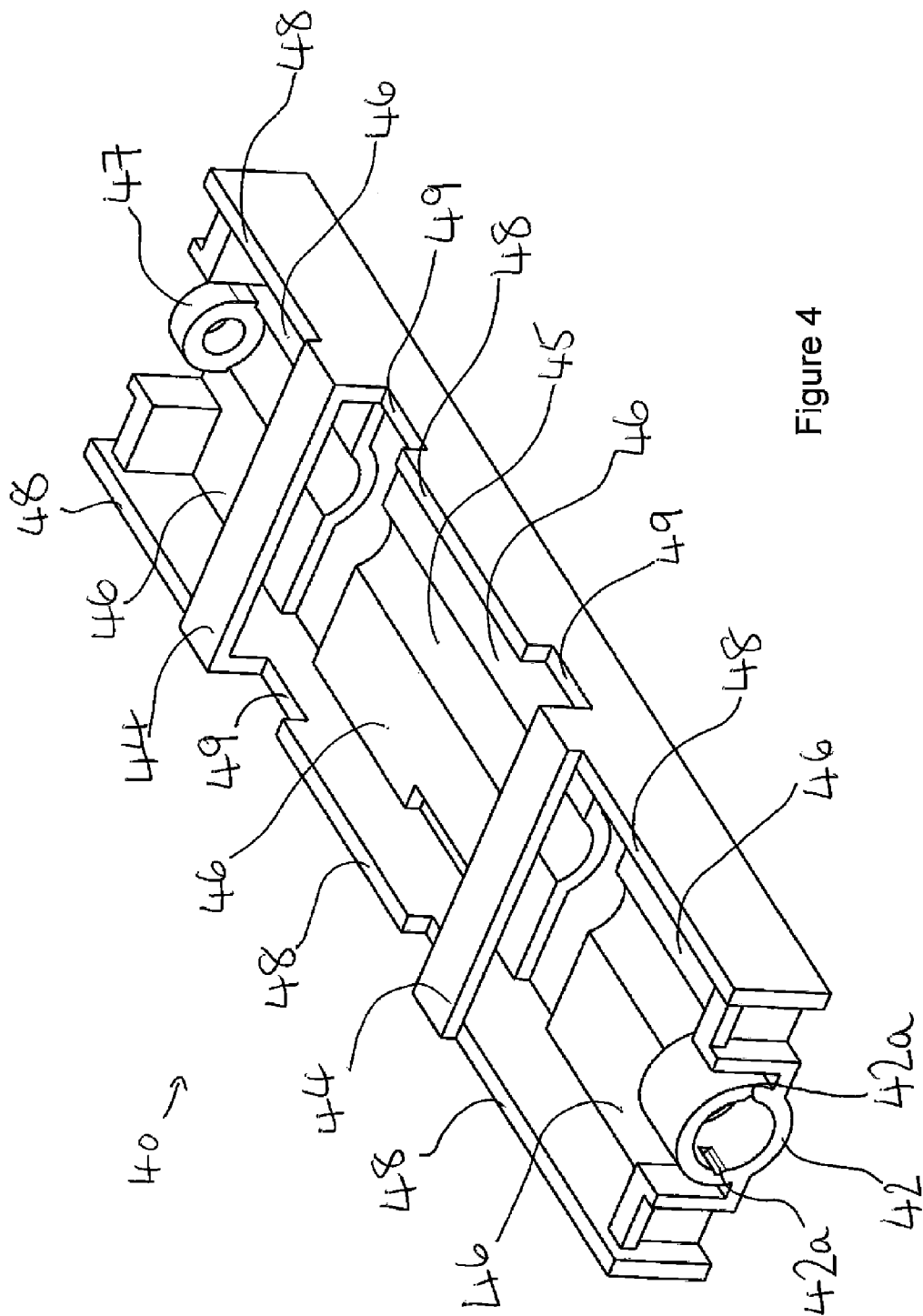
FIG. 4 is a perspective view of a mounting platform in accordance with a preferred embodiment of the invention.

FIG. 4 shows a back panel 40 of an electrical device that may be attached to shaft 20 and locks 30a and 30b described herein. Back panel 40 may be referred to as mounting platform 40. Panel 40 is substantially rectangular in shape and comprises a circular support or guide 42 at one end, and a stop 47 at the opposite end. Within guide 42 are a pair of slots 42a extending partway along the length of guide 42. In other embodiments, more or fewer slots may be provided in guide 42.

A pair of lock-retaining features 44 extend from one edge of panel 40 to the opposite edge. Opposite lock-retaining features 44 are openings that permit the moulding of lock-retaining features 44. A concave channel or groove 45 formed within panel 40 extends lengthways from guide 42 to stop 47, to provide clearance for shaft 20 when shaft 20 is assembled with panel 40. On either side of channel 45 are lock-sliding surfaces 46. Along an outer edge of panel 40 are disposed various clipping elements 48 for engagement with the electronic device, as will be seen later. Along the outer edge are also formed rail recesses 49.

It should be noted that back panel or mounting platform 40 may take various different forms, and its shape and configuration may depend to a degree on the particular shape of the electrical device or component that is to be mounted to the locking device of the present invention. Indeed, in other embodiments, electrical devices or components may be fixed directly to shaft 20.

Figure 5:
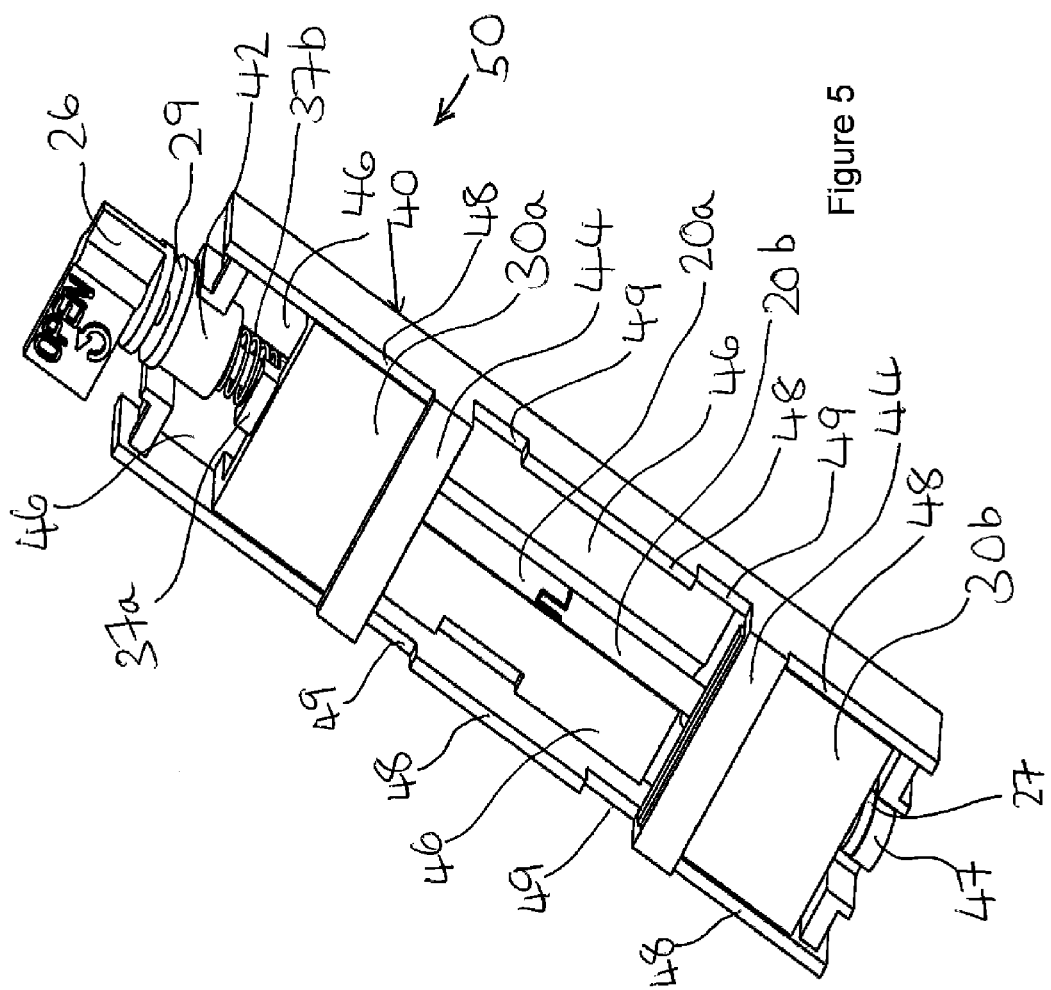
FIG. 5 is a perspective view of a locking device in accordance with a preferred embodiment of the invention.

FIG. 5 shows a fully assembled locking device 50 according to a preferred embodiment of the invention. Locking device 50 comprises shaft 20 coupled with locks 30*a* and 30*b*, and attached to panel 40. It should be noted that in other embodiments the locking device may simply comprise shaft 20 coupled with locks 30*a* and 30*b*, in which case other means of attaching electrical components to the locking device may be used, without having to require panel 40.

In order to assemble the structure shown in FIG. 5, lock 30*b* is first threaded onto shaft portion 20*b* by engaging threaded bore 32*b* with threaded portion 24*b*. Shaft portion 20*b*, with lock 30*b* attached thereto, is then engaged with panel 40 such that stop 27 abuts against stop 47. Stopping portions 36*b* of lock 30*b* are arranged to slide against lock sliding surfaces 46.

Lock 30*a* is then engaged with panel 40 such that stopping portions 36*a* lie flush with lock sliding surfaces 46. Shaft portion 20*a* is then inserted through guide 42 and through threaded bore 32*a* of lock 30*a* until threaded portion 24*a* engages with threaded bore 32*a*. By rotating shaft portion 20*a*, lock 30*a* may fully engage with threaded portion 24*a*. As seen in the embodiment of FIG. 5, shaft portion 20*a* may first be inserted through a spring 37*b* before being passed through threaded bore 32*a*. Spring 37*b* rests in spring guide 37*a* and one end engages with lock 30*a* whilst the other engages with guide 42. Although not shown in FIG. 5, a second spring may be included between lock 30*b* and stop 27. Spring 37*b* advantageously reduces backlash such as axial or radial play when rotating shaft 20 relative to locks 30*a* and 30*b*.

Locking device 50 is arranged such that when lock 30*a* is fully engaged with shaft portion 20*a*, the innermost end of shaft portion 20*a* meets with the innermost end of shaft portion 20*b*. The two shaft portions may then be joined together to form join 22 by using a mechanical or thermal technique.

Locking device 50 is further arranged such that stopping portions 36*a* and 36*b* of locks 30*a* and 30*b* abut lock sliding surfaces 46. In operation, rotation of shaft 20 by means of handle 26 causes shaft 20 to rotate relative to locks 30*a* and 30*b* due to the abutment of locks 30*a* and 30*b* (and in particular stopping portions 36*a* and 36*b*) against lock sliding surfaces 46. Through the engagement of threaded bores 32*a* and 32*b* and their respective threaded portions 24*a* and 24*b* of shaft 20, locks 30*a* and 30*b* may translate back and forth along axis of rotation R of shaft 20.

Figure 6:
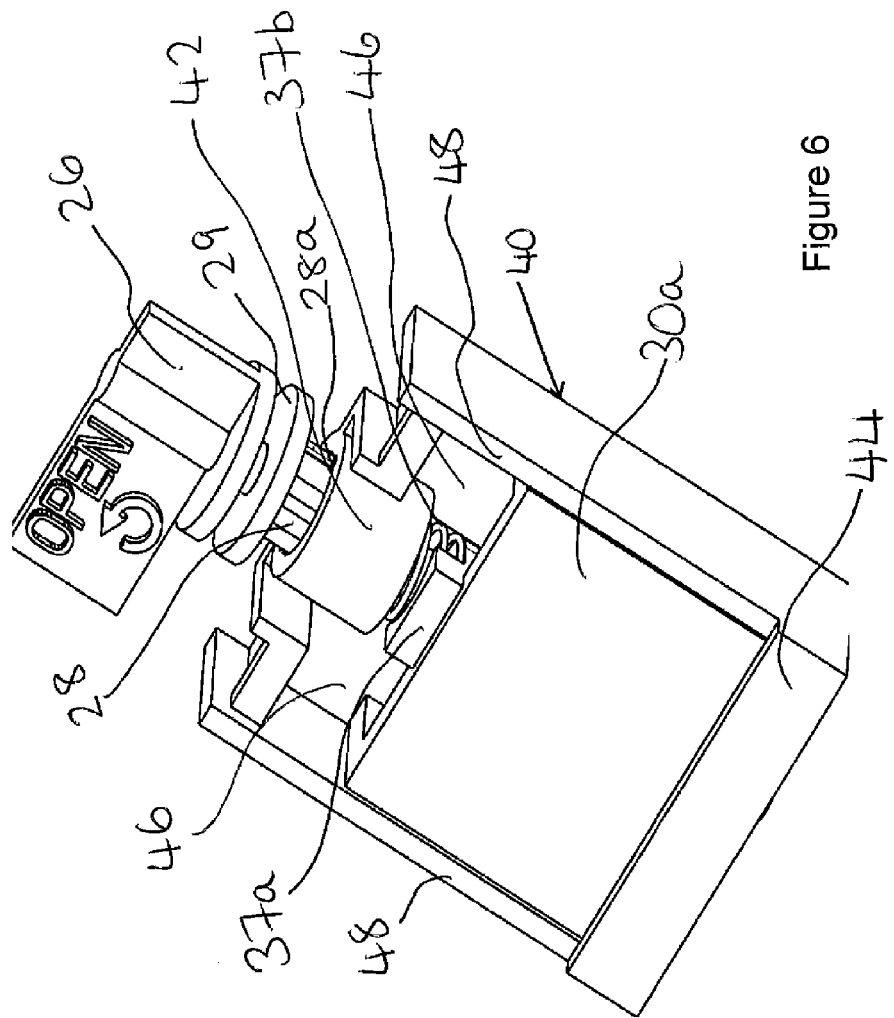
FIG. 6 is a close-up view of an end of the locking device of FIG. 5, showing the indexing member in greater detail.

FIG. 6 is a close-up of one end of locking device 50, showing in greater detail indexing member 28 of shaft 20. Indexing member 28 comprises a raised portion 28*a* which slots into or otherwise engages with slots 42*a* of guide 42. Raised portion 28*a* is resilient such that it may be moved from one slot 42*a* to the other by rotation of shaft 20. Given this natural resilience of raised portion 28*a*, a user may sense when raised portion 28*a* has 'clicked into' a slot 42*a*. In other embodiments, indexing member 28 may comprise more than one raised portion 28*a*.

Figure 7:
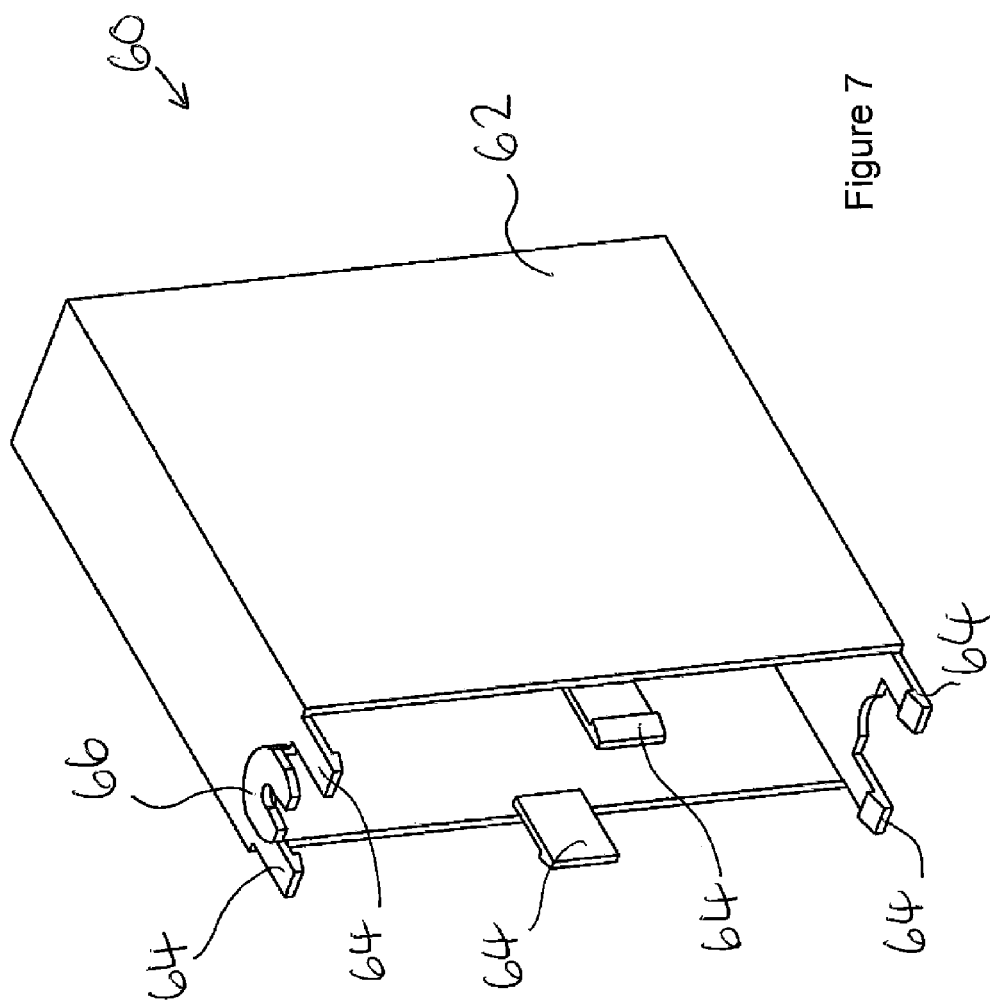
FIG. 7 is a perspective view of an electrical device to be attached to the locking member of FIG. 5.
Figure 8:
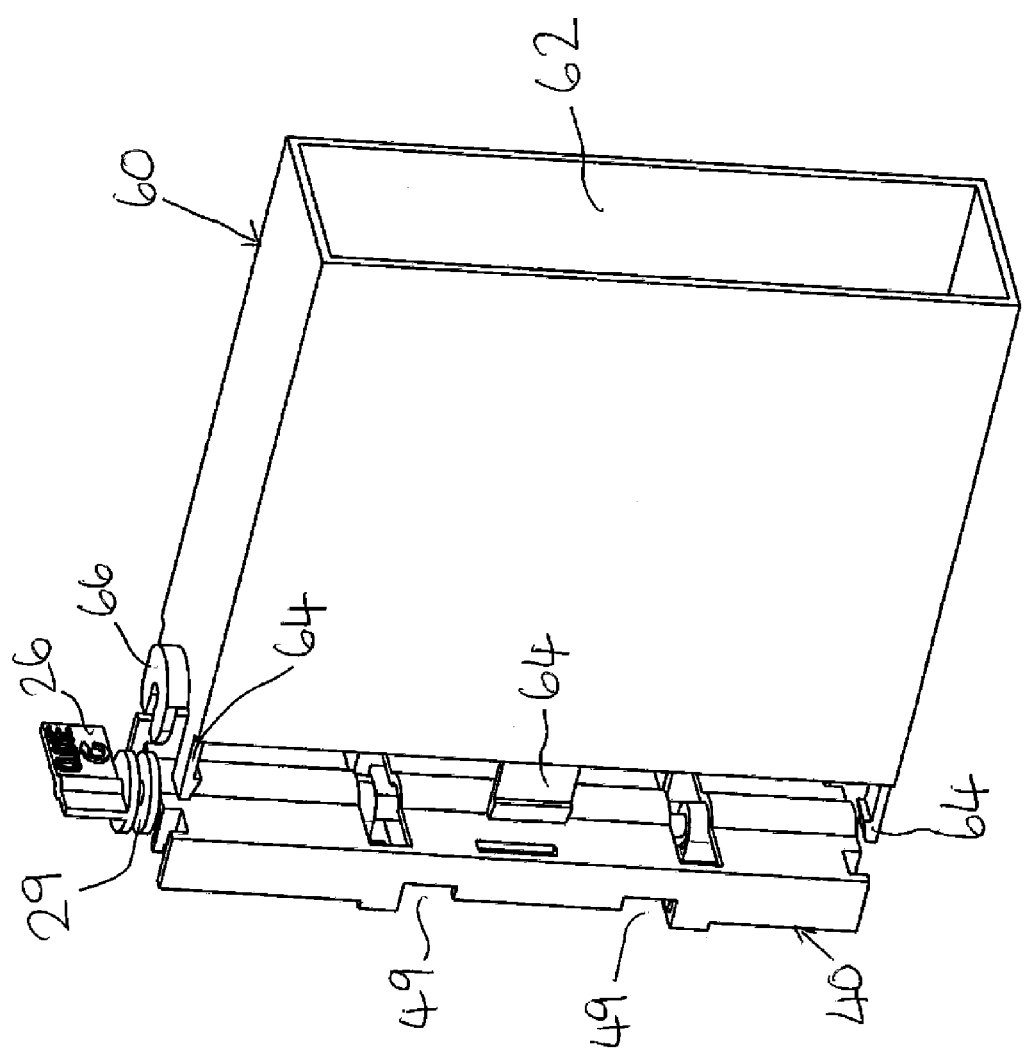
FIG. 8 is a perspective view of the electrical device of FIG. 7 attaching to the locking device of FIG. 5.
Figure 9:
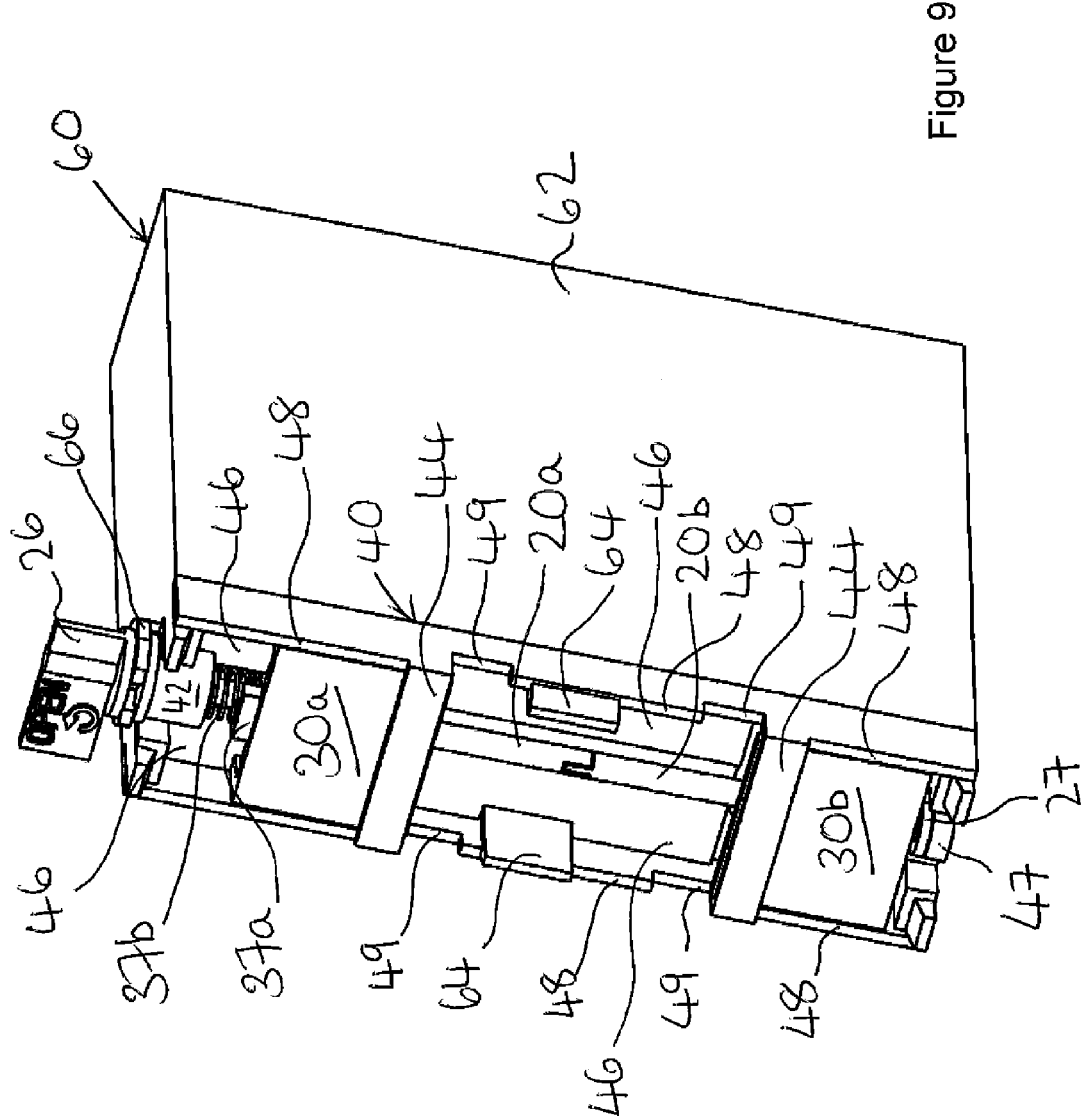
FIG. 9 is a perspective view of the locking device with electrical device attached thereto.

FIG. 7 shoes the main body 62 of an electrical device 60 that may engage with the assembly shown in FIG. 5. Electrical device 60 comprises a number of engaging members 64 arranged to clip into slots on the back side of panel 40 and engage with corresponding clipping elements 48 on panel 40. This engagement may be more clearly seen in FIG. 8. In particular, jaws 66 of electrical device 60 may lock into annular groove 29 to axially lock shaft 20 in place relative to electrical device 60. Note that in FIG. 8 the front panel of electrical device 60 is omitted. Inside electrical device 60 may be arranged electrical circuits, whilst on the exterior there may be connectors and/or switches. FIG. 9 shows the electrical device 60 attached to locking device 50.

Figure 10:
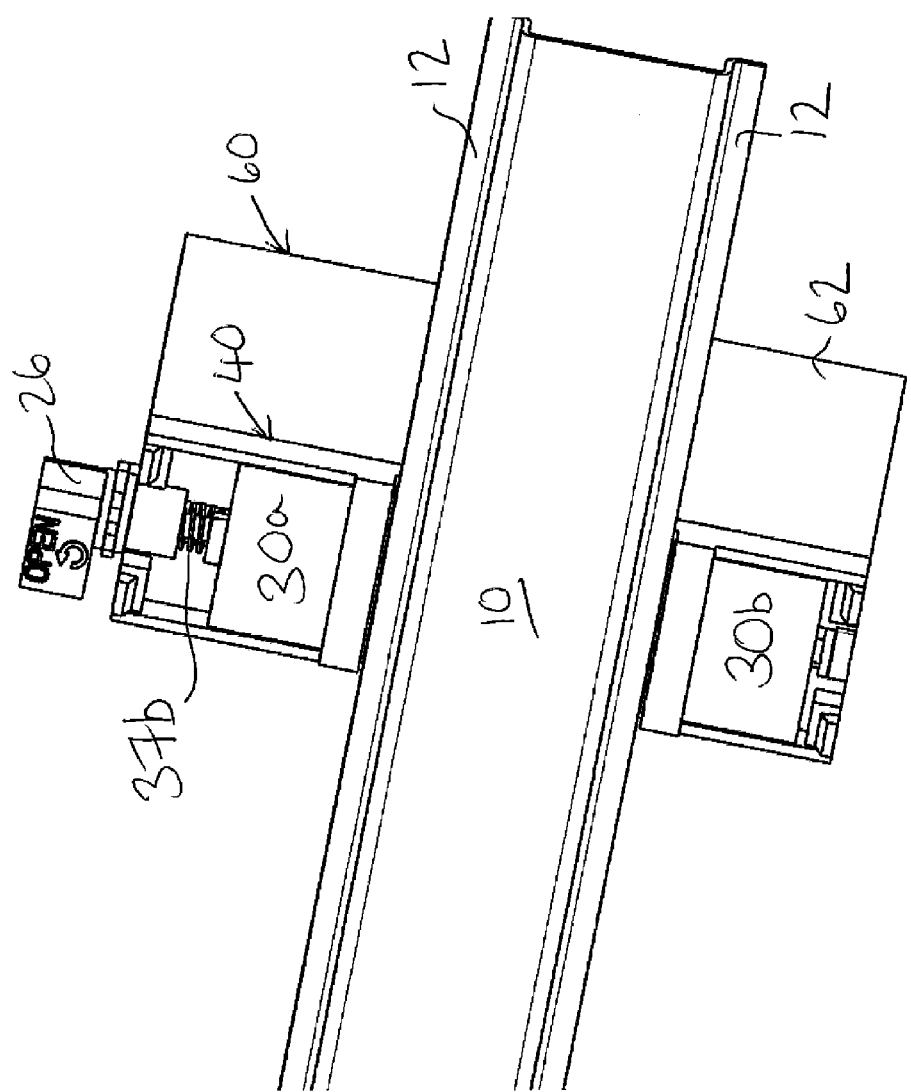
FIG. 10 is a perspective of the locking device in an unlocked position, prior to being locked to a DIN rail.
Figure 11:
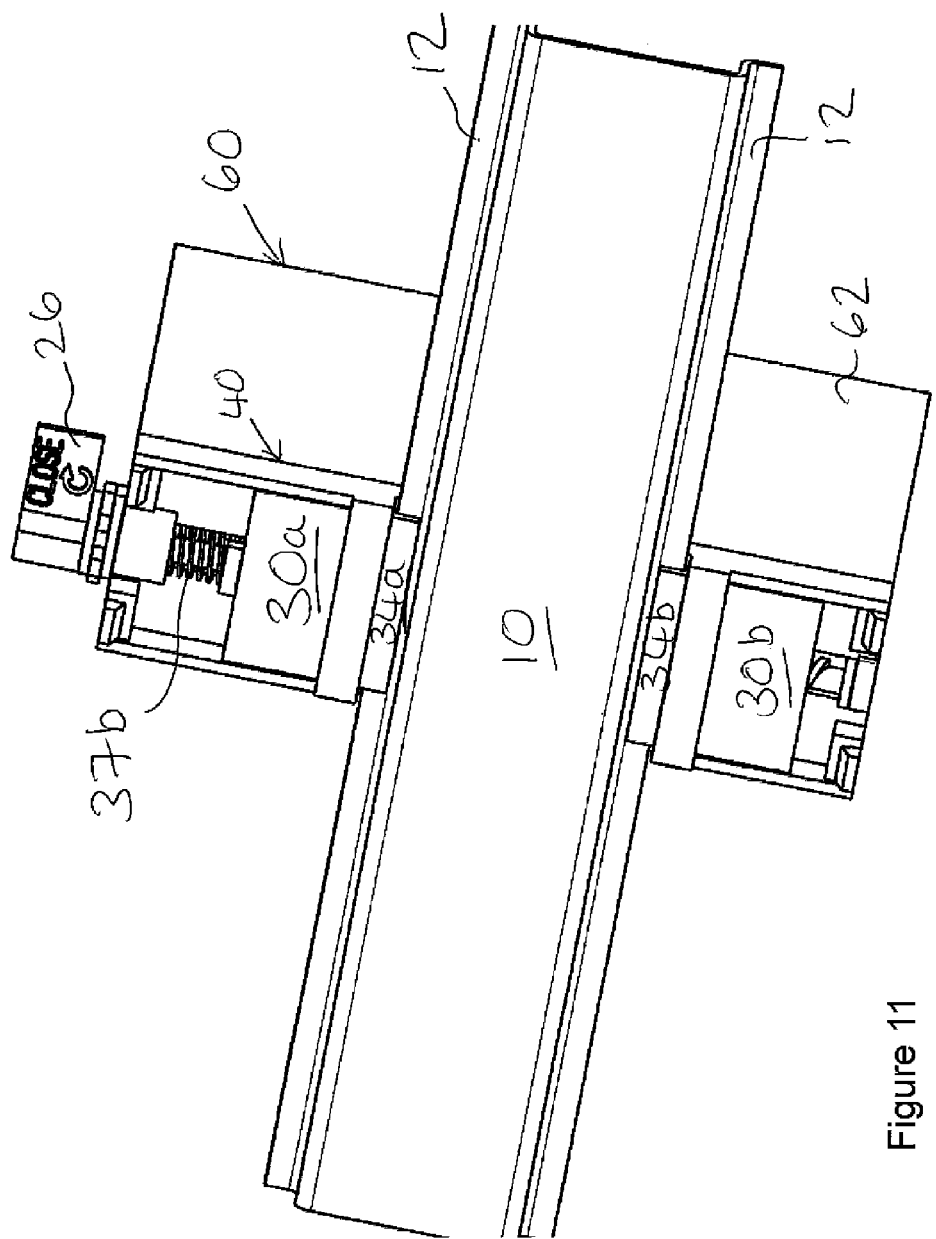
FIG. 11 is a perspective of the locking device in a locked position, locked to a DIN rail.

When a user wishes to mount an electrical device to a DIN rail, locking device 50 such as the one described above may be used in the following fashion. FIG. 10 shows DIN rail 10 of a hat-shaped cross-section positioned between locks 30*a* and 30*b* of locking or clamping device 50. In particular, outwardly protruding flanges 12 of DIN rail 10 are each arranged to be positioned within a respective rail recess 49 formed in panel 40. Thus, locks 30*a* and 30*b* have been retracted, through rotation of shaft 20, to a distance sufficient to allow outwardly protruding flanges 12 of DIN rail 10 to be positioned within rail recesses 49. Clamping or locking device 50 may then be activated or triggered by rotating shaft 20 so as to move, urge or otherwise translate locks 30*a* and 30*b* towards each other (as seen in FIG. 11). Lock retaining features 44 provide support for shaft 20 such that shaft 20 is prevented from being subjected to excess stress or strain when an electrical device 60 is attached to locking device 50.

FIG. 11 shows locking device 50 in the locked position (as indicated by the marker "closed" on handle 26). Locks 30*a* and 30*b* have been closed onto DIN rail 10 such that rail-contacting portions 34*a* and 34*b* overlap flanges 12 of DIN rail 10. Furthermore, stopping portions 36*a* and 36*b* abut flanges 12 and provide a clamping force against flanges 12. When in the locked position shown in FIG. 11, locking device 50 together with electronic component 60 are prevented from moving in at least a direction normal to the longitudinal axis defined by DIN rail 10 and axis of rotation R of shaft 20. For example, if DIN rail 10 in FIG. 11 were positioned horizontally across a ceiling, then locking or clamping device 50 would be clamped thereto and prevented from falling, allowing the electrical device 60 to be securely locked to DIN rail 10. It should be noted that stopping portions 36*a* and 36*b* need not contact flanges 12, and locking device 50 may be suspended from DIN rail 10 simply by means of rail-contacting portions 34*a* and 34*b* engaging flanges 12.

Any feature of the above-described embodiments may be combined with the features of another embodiment, by making the appropriate changes. Whilst the invention has been described in connection with preferred embodiments, it is to be understood that the invention is not limited to these embodiments, and that alterations, modifications, and variations of these embodiments may be carried out by the skilled person without departing from the scope of the invention. For example, whilst in the above-described embodiment of a shaft and translating locks have been described, the invention is not limited to this form. The invention is intended to embrace any device configured to urge rail-engaging members or locks into engaging positions with a DIN rail positioned between the first and second rail-engaging members.

For example, in an alternative embodiment (not shown), rotation of the shaft could cause a cam arrangement to in turn rotate or otherwise bring locks into contact and engagement with a DIN rail, without necessarily causing the locks to translate. In yet a further embodiment, it could be envisaged that locks 30a and 30b do not comprise rail-contacting portions 34a and 34b, but instead a clamping action is simply exerted between stopping portions 36a and 36b and flanges 12 of DIN rail 10.

Furthermore, if larger electrical devices are needed to be attached to a DIN rail, then multiple locking devices may be used for a single electrical device.

It is also possible that the invention may be used to lock to any generic rail, and not necessarily a DIN rail.

The invention claimed is:

1. A device for locking to a DIN rail, comprising:
    a shaft defining an axis of rotation; and
    first and second rail-engaging members connected to the shaft and each shaped to engage a DIN rail in a respective engaging position, wherein the shaft is rotatable about the axis of rotation and thereby arranged to urge each rail-engaging member into its respective engaging position with a DIN rail positioned between the first and second rail-engaging members, wherein the device is coupled with a platform capable of supporting a component mounted thereto, wherein the shaft comprises a resilient member received within a corresponding recess of the platform, and wherein the device is arranged such that rotation of the shaft relative to the platform causes the resilient member to disengage from the recess.

2. The device of claim 1, wherein the shaft is further arranged to cause the first and second rail-engaging members to translate in opposite directions.

3. The device of claim 2, wherein the translation is in a direction substantially parallel with the axis of rotation.

4. The device of claim 1, wherein the shaft is further arranged to simultaneously urge the first and second rail-engaging members into their respective engaging positions.

5. The device of claim 1, wherein the first and second rail-engaging members each comprise a threaded bore.

6. The device of claim 1, wherein the shaft comprises first and second threaded portions.

7. The device of claim 6, wherein the shaft is formed of at least two shaft portions joined together, each of two of the at least two shaft portions comprising one of the threaded portions.

8. The device of claim 1, wherein the shaft comprises first and second threaded portions, wherein the first and second rail-engaging members each comprise a threaded bore, and wherein the first and second rail-engaging members are connected to the shaft such that the threaded bore of each rail-engaging member engages with a respective threaded portion of the shaft.

9. The device of claim 6, wherein each threaded portion comprises a direction of rotation opposite to that of the other threaded portion.

10. The device of claim 1, wherein the DIN rail has a top hat cross-section.

11. The device of claim 1, wherein each rail-engaging member comprises a rail-contacting portion arranged such that, in the engaging position of the rail-engaging member, the rail-contacting portion engages a portion of the DIN rail such that the device is prevented from moving relative to the DIN rail in at least one direction.

12. The device of claim 11, wherein the at least one direction comprises a direction normal to the axis of rotation of the shaft and substantially normal to a longitudinal axis defined by the DIN rail.

13. The device of claim 11, wherein each rail-contacting portion of the first and second rail-engaging members is arranged to engage with an outwardly extending flange of the DIN rail.

14. The device of claim 1, wherein the device further comprises an indexing member for indicating a magnitude of a rotation of the shaft relative to the platform.

15. A method of mounting a component to a DIN rail, comprising:
    positioning the DIN rail between first and second rail-engaging members connected to an actuator;
    triggering the actuator so as to simultaneously urge each rail-engaging member into engagement with the DIN rail; and
    mounting a platform of the component to the actuator and/or at least one of the rail-engaging members so a resilient member of the actuator is received within a corresponding recess of the platform to allow the resilient member to disengage from the recess when the actuator is rotated relative to the platform.

16. The method of claim 15 wherein the actuator includes a shaft and wherein triggering the actuator includes rotating the shaft so the first and second rail-engaging members translate in opposite directions.

17. The method of claim 15 wherein the actuator comprises first and second threaded portions, wherein the first and second rail-engaging members each comprise a threaded bore, the method further comprising connecting the first and second rail-engaging members to the actuator such that the threaded bore of said each rail-engaging member engages with a respective threaded portion of the actuator.

18. The method of claim 17 wherein each threaded portion comprises a direction of rotation opposite to that of the other threaded portion.

19. The device of claim 1, wherein the DIN rail has a C-shaped cross-section.

20. The device of claim 1, wherein the DIN rail has a G-shaped cross-section.

* * * * *